Oct. 15, 1929.                W. R. WILSON                1,731,693

ADVERTISING DEVICE

Filed Aug. 31, 1925

Housewives Service League
270 Madison Avenue, New York City

Servatab
trade mark.

BREAKFAST
Grapefruit
Cornflakes and Bran
With Cream
Bacon and Poached
Eggs    Toast
Coffee

LUNCHEON OR SUPPER
Celery Soup
Saltines
Peanut Butter and
Lettuce Sandwiches
Stewed Pears
Ginger Wafers
Tea or Milk
(SEE OTHER SIDE FOR RECIPE)

DINNER
Hamburger Steak
With Tomato Sauce
Escalloped Potatoes
Gratin
Peas    Cold Slaw Salad
Boiled Dressing
Melon

| COMMODITY | BRAND | AMOUNT | COMMODITY | BRAND | AMOUNT |
|---|---|---|---|---|---|
| BEVERAGES: | | | FATS & OILS: | | |
| Tea | SALADA | | Cooking Fats | MAZOLA | |
| Coffee | MAXWELL HOUSE | | Oleomargarine | GOOD LUCK | |
| Cocoa-Chocolate | BAKER'S | | Lard | SILVER LEAF | |
| Ginger Ale | CLICQUOT CLUB | | Nut Butter | NUCOA | |
| Near Beer | ANHEUSER-BUSCH | | Salad Oil | WESSON | |
| Grape Juice | WELCH'S | | Olive Oil | HEINZ | |
| Coca-Cola | COCA-COLA | | | | |
| | | | SUGARS & SYRUPS: | | |
| | | | Sugar, Wht. & B. | DOMINO / FRANKLIN | |
| CANNED GOODS: | | | Syrup | MARY JANE | |
| Fruits | DEL MONTE | | Molasses | BRER RABBIT | |
| Vegetables | VAN CAMP'S | | | | |
| Milk | BORDEN'S | | | | |
| Soups | CAMPBELL | | | | |
| Kippered Herring | MARSHALL'S | | SOAPS, CLEANSERS, ETC.: | | |
| Cod Fish | GORTON'S | | Toilet Soap | PALM OLIVE | |
| Meats | RICHARDSON & ROBBINS | | Laundry Soap | CHIPSO / LUX / OLD DUTCH | |
| | | | Cleansers | GOLD DUST / KITCHEN CLEANSER / DUZ | |
| | | | Toilet Paper | SCOTT | |
| CEREALS & FLOURS: | | | | | |
| Cereals | SHREDDED WH'T BS / TRISCUIT / POST TOASTIES / BRAN FLAKES / KELLOGG'S BRAN | | MIS'CL. GROCERIES: | | |
| | | | Gelatine | CERTO | |
| Macaroni | CRESCENT | | Crackers | NAT'L BISCUIT | |
| Tapioca | MINUTE | | Peanut Butter | | |
| Flour | GOLD MEDAL / AUNT JEMIMA / VIRGINIA SWEET | | Yeast | FLEISCHMANN | |
| | | | Nuts | | |
| | | | Baking Powder | K. C. | |
| | | | FRESH MEATS: | | |
| | | | Ham | SWIFT | |
| CONDIMENTS: | | | Bacon | SWIFT | |
| Pickles | HEINZ | | Beef... Lamb... Veal... Pork... Chicken | | |
| Vinegar | HEINZ | | Sausage | | |
| Salad Dressing | PARAMOUNT | | | | |
| Worcestershire | LEA & PERRIN'S | | | | |
| Ketchup | SNIDER'S | | FRUITS: | | |
| Salt | PENSAL | | Fresh: Melons... Peaches... Apples... Lemons... Oranges... Pears | | |
| Pepper, Spices | | | Dried: Raisins... Prunes... Apricots | | |
| Flavoring Ext's | BURNETT'S | | | | |
| | | | FRESH VEGETABLES: | | |
| DAIRY PRODUCTS: | | | Potatoes... Beets... Carrots... Turnips | | |
| Cheese | KRAFT | | Spinach... Lettuce.. Tomatoes.. Cabbage | | |
| Butter, Eggs | | | Celery... Onions... Beans... Cucumbers | | |
| Milk, Cream | | | Peppers... Peas | | |

If you have friends or relatives whom you think would like to receive SERVATABS, send name and address to The STAR, and they will be supplied immediately.

Wilbe R Wilson
INVENTOR

BY H H Snelling
ATTORNEY

Patented Oct. 15, 1929

1,731,693

UNITED STATES PATENT OFFICE

WILBE R. WILSON, OF DECATUR, GEORGIA

ADVERTISING DEVICE

Application filed August 31, 1925. Serial No. 53,683.

This invention relates to advertising devices and has for its principal object the provision of means for putting the name or trademark of an advertiser into the mind of the ultimate consumer at the time he or she is making the purchase or at the psychological moment when the consumer is making up his or her mind as to what shall be bought, this moment, as specifically set forth in the following description, being the time the housewife is making up her marketing list.

A further object of the invention is the provision of a carefully arranged series of sheets each for a single day, arranged in pads of one month each, the cards having thereon information so handy and useful as to be retained by the housewife and used in telephoning her orders for groceries, such sheets having sandwiched thereon between the amount of a commodity to be ordered and the name of that commodity, the brand-name, trade-mark, or firm name of the advertiser, so that the advertisement shall be most efficacious, the brand being necessarily present in the mind of the housewife as she gives the order as she cannot possibly read off the name of the ingredient and the amount required without seeing the preferred brand as a suggestion.

The great producers who yearly spend huge sums in advertising their products are no longer satisfied to have great displays irrespective of the relative time of display or the chance of retention of the advertisement in the mind of the buyer at the time of making the next purchase but are demanding that the display be shown as near as possible to the place of completing the desire for purchase. The psychology of advertising has become an intense study and it is fully realized that the best medium is one that it not too conspicuous but one which by constant repetition will cause retention in the mind of the brand to be called for, particularly when the advertisement carries no idea of limitation to that brand but merely a suggestion that the brand specified is slightly better or more advantageous.

In the present invention I have sought to make use of these known principles and to provide a housewife with an object most useful to her particularly because she is under no obligation whatever to buy a single one of the brands listed, the thought being that by constantly seeing the brand names and particularly so at the time of ordering she will actually favor the listed brands.

The drawing shows the face of a blank embodying my invention.

On the face of the blank as shown, at the top, I give a menu which covers three meals, for example, breakfast 10, luncheon or supper 11, and dinner 12, these menus giving a balanced ration for the entire day and are worked out in the usual manner taking into consideration the geographical location of the place where the blanks are to be used; the food values and availability of the different commodities, economy and the appetizing nature of the products. The menus will naturally vary very materially thruout the year and to some extent will vary quite materially with the latitude or other geographical characteristic of the place. The blank will be bound in pads or tablets, preferably of 30 or 31 sheets, depending upon the month covered, and the menus from day to day will be as different as possible. The actual making of the menu forms absolutely no part of the invention and is covered by well-known principles of dietetics.

I preferably separate the menu from the rest of the face of the blank by a rule 15 here shown as running horizontal. Below the rule I list a number of different ingredients in the vertical column 16 headed "Commodity" and horizontally from the different ingredients in a vertical column 17 I provide spaces in which are to be inserted the amount of the different commodity required or a notation that that ingredient needs to be ordered.

In a convenient place in close proximity to the amount of space and preferably to the commodity name as well, I arrange a column 18 which I have labeled "Brand" and this column I believe, will find its greatest advantage if sandwiched in between the commodity and the amount as in such manner it will be impossible to read off for example, that 5 pounds of coffee are required without seeing the advertising words "Maxwell House" which is positioned between the amount and the name of the goods, i. e., coffee.

As shown the listings are in two separate columns divided by a double rule 20 but obviously there can be more than two divisions and in some cases I prefer to have but a single column while in other cases I prefer that the columns shall run horizontally instead of vertically in which case the brand will be directly beneath the commodity and the amount will be beneath that.

Under the general menu 12 in the upper right hand corner of the face of the blank as first item will be found "hamburger steak with tomato sauce" and under the recipe 22 will be found a complete instruction for the making of this dish, including of course, the amount of the different commodities required. In general the experienced housewife will merely check the ingredient required without giving the actual amount needed but young housekeepers will find it convenient to enter figures in the amount column 17. In the recipe I much prefer not to repeat the preferred trade-name or brands as the atmosphere of usefulness is sometimes clouded when a trade-name is injected into the menu itself, often thru a mistaken fear that the insertion carries an idea of limitation to that brand, and as this is something that it is much desired to avoid I therefore keep the recipe 22 scrupulously free from suggested brand purchases.

Obviously the invention is not to be limited to groceries as it is well suited to the advertising of other very different commodities changing the face of the blank to suit but not altering the principle of the invention. For example, if one is to advertise radio products, the menu would be replaced by a hook-up and in the amount column shown as blank in the preferred form, the various quantities required would be printed in, as in this case it could be readily assumed that the purchasers kept no stock at all, differing in this respect from the housewife who always seeks to keep a reasonable supply of everything on hand.

What I claim is:—

1. In an advertising device, a blank order form having thereon a vertical list of commodities and in horizontal relation with each commodity an appropriately designated blank space suitable for checking that the commodity is required or to show how much of the commodity is needed, and having between the name of the commodity and the blank space an appropriate trade-mark name to suggest what brand to purchase.

2. In an advertising device, a blank order form having thereon an alined list of articles which may be purchased or replenished at irregular intervals, a blank space appropriately designated to receive in proximity to the name of each article, the amount of that article may be included in making the next order or purchase, and an alined list of suggested brands between the article list and the blank space, each brand name being so placed as to separate the name of any article from the amount of that article desired, whereby the name and amount of an article cannot be read off to give the order without simultaneously reading the suggested brand.

3. In an advertising device, a blank having a list of articles, a blank column designated for filling in the number or quantity of the several articles desired, and adjacent each article name, the trade-name of a chosen advertiser selling such article.

In testimony whereof I affix my signature.

WILBE R. WILSON.